July 22, 1924.
W. BRINTZENHOFE
FISHING REEL ATTACHMENT
Filed Aug. 30, 1922
1,501,939
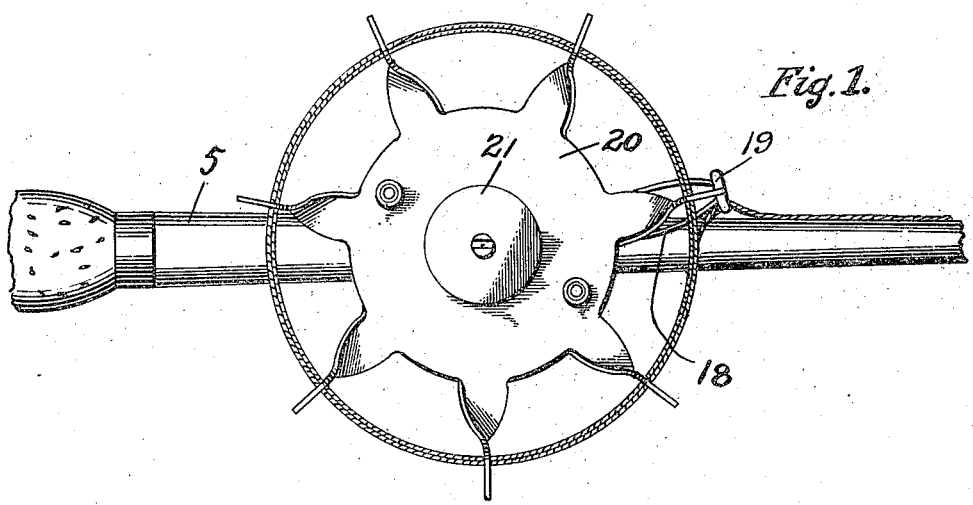
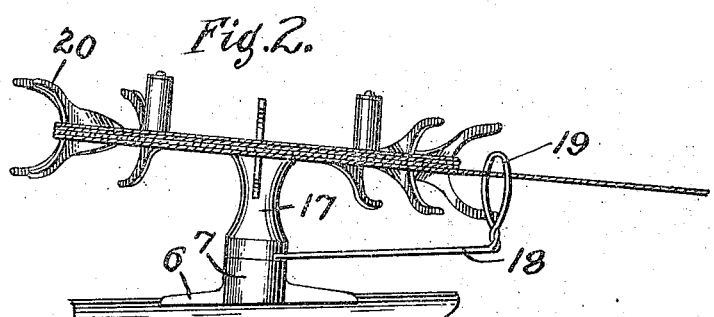
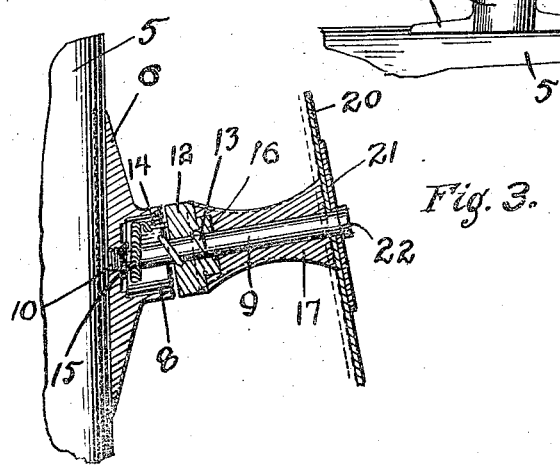
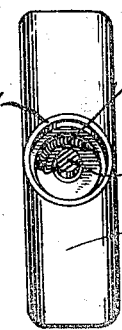
Inventor
Walter Brintzenhofe.

Patented July 22, 1924.

1,501,939

UNITED STATES PATENT OFFICE.

WALTER BRINTZENHOFE, OF BLUFFTON, INDIANA.

FISHING-REEL ATTACHMENT.

Application filed August 30, 1922. Serial No. 585,223.

*To all whom it may concern:*

Be it known that I, WALTER BRINTZENHOFE, a citizen of the United States, residing at Bluffton, in the county of Wells and State of Indiana, have invented certain new and useful Improvements in Fishing-Reel Attachments, of which the following is a specification.

My invention relates to improvements in fishing reel attachments.

An object of my invention is to provide a fishing reel attachment, that is adapted to be an automatic brake for said reel.

A further object of my invention is to provide a fishing reel attachment, wherein during the casting operation, the pull of the bait automatically releases the brake, and when the bait stops the slack of the line automatically applies the brake.

A further object of my invention is to provide a fishing reel attachment, that is strong, durable, simple and inexpensive in construction, and that is well adapted to the use for which it is designed.

Other objects and advantages of the invention will become apparent during the course of the following description.

In the drawings, wherein like numerals are employed to designate like parts throughout the same, Figure 1 is a top plan view of a fishing reel showing the braking plate used in accordance with my invention, Figure 2 is a side elevation of Figure 1, Figure 3 is a vertical section taken through the same, and Figure 4 is a section taken on line 4—4 of Figure 3.

In the drawings, wherein for the purpose of illustration is shown a preferred embodiment of my invention, the numeral 5 designates an ordinary fishing pole, upon which is mounted the base 6 of my improved fishing reel. The base 6 is provided with the annular portion 7, in which is an annular recess 8. A vertical shaft 9 is mounted centrally of the annular recess 8, by means of the screw threads 10 within the base 6.

A collar 12 is mounted on the vertical shaft 9, and is adapted to be held in place by means of the threads 13, said collar 12 being provided with a depending finger 14 which engages one end of a coiled spring 15. The other end of the coiled spring 15 is fixed to either the member 7 or the vertical shaft 9 in any desired manner. The other side of the collar 12 is provided with a reduced portion 16, and the upper half of the reel 17 is mounted on the shaft 9 and seats on the collar 12, said reduced portion being adapted to be received within a recess within said upper member 17. A line guide 18, having an eye 19 is carried by the collar 12, and is adapted to rotate the collar 12 thereby raising or lowering the same on the threads 13. The upper portion of the reel 17, is provided with the reel member 20, which may be of any ordinary construction now in use. The vertical shaft 9 is adapted to be extended through the upper portion 17, and is provided with internal left-hand threads in its upper end. A disk 21 is mounted above the reel member 20 and is held in place by means of a bolt 22, which is also provided with left-hand threads, said bolt being adapted to be received within the internally threaded recess within the vertical shaft 9, thereby holding the disk in place. It will thus be seen, that by having the left-hand threads, the disk will not become disengaged when the reel is rotated.

In use, the device will be assembled as is clearly shown in the drawings, with the line wrapped around the reel member 20 and passing through the eye 19 of the line guide 18, which is carried by the collar 12. It will readily be seen, that when casting the pull of the bait, will pull the wire guide around causing the collar to back away from the upper portion 17, and the reel is allowed to turn freely. When the bait is stopped, the slack in the line allows the spring 15 to partially rotate the collar 12 which carries the wire guide 18, thereby causing the member 17 to raise, thereby also causing frictional contact with the disk 21, said disk acting as a brake thereby causing the reel to stop. It will be seen, that in reeling in the line, the brake, through the clockwise movement of the reel is released, even if there is no pull on the line. It is essential to have the disk 21 held in place by means of a bolt that is provided with left-hand threads, as clearly shown in the drawings so that the same will not become disengaged when in use. It will at once be seen, when I have devised a very simple and effective brake attachment for an ordinary fishing reel, that is very easily constructed.

It is to be understood that the form of my invention herewith shown and described, is to be taken as a preferred embodiment of the same, and that various changes in the shape, size and arrangement of parts may be resorted to, without departing from the spirit of my invention, or the scope of the subjoined claims.

Having thus described my invention, I claim:—

1. In a fishing reel, a brake, spring means normally holding the brake in operative braking position with the reel, and means for releasing the brake through the movement of the reel during the reeling in of the line.

2. A fishing reel comprising a base, a shaft carried by the base, a collar threaded on the shaft, a line guide carried by the collar, a reel portion mounted on said shaft laterally of said collar and a disk mounted on the end of said shaft, said line guide being adapted to rotate the collar on said shaft into and out of binding engagement with the reel.

3. A fishing reel comprising a base, a shaft carried by said base, a collar mounted on said shaft, a line guide carried by said collar, a reel portion mounted on said shaft above said collar, and a disk mounted on the end of said shaft, said line guide being adapted to move said reel portion in and out of engagement with said disk.

4. A fishing reel comprising a base, a shaft carried by said base, a collar mounted on said shaft, a reel portion mounted on said shaft, a disk mounted on the end of said shaft, a line guide carried by said collar, and a coil spring adapted to hold said reel portion in frictional contact with said disk.

In testimony whereof I affix my signature in presence of two witnesses.

WALTER BRINTZENHOFE.

Witnesses:
 ABE ERNST,
 W. E. SIMONS.